US008504703B2

(12) United States Patent
Vega et al.

(10) Patent No.: US 8,504,703 B2
(45) Date of Patent: Aug. 6, 2013

(54) SYSTEMS AND METHODS FOR INSTRUCTION SEQUENCE COMPOUNDING IN A VIRTUAL MACHINE ENVIRONMENT

(75) Inventors: Rene Antonio Vega, Kirkland, WA (US); Eric P. Traut, Bellevue, WA (US); Mike Neil, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1838 days.

(21) Appl. No.: 10/882,891

(22) Filed: Jun. 30, 2004

(65) Prior Publication Data

US 2005/0080753 A1    Apr. 14, 2005

Related U.S. Application Data

(63) Continuation-in-part of application No. 10/685,051, filed on Oct. 14, 2003, now Pat. No. 7,552,426.

(51) Int. Cl.
*G06F 15/16* (2006.01)
*G06F 9/455* (2006.01)

(52) U.S. Cl.
USPC .......................................... 709/229; 718/1

(58) Field of Classification Search
USPC ....................................................... 709/229
See application file for complete search history.

(56) References Cited

U.S. PATENT DOCUMENTS

| 6,216,220 B1 * | 4/2001 | Hwang .......................... 712/219 |
| 6,397,242 B1 | 5/2002 | Devine et al. |
| 6,658,657 B1 | 12/2003 | Lueh |
| 6,948,052 B2 * | 9/2005 | Nguyen et al. ................ 712/207 |
| 7,127,548 B2 | 10/2006 | Bennett et al. |
| 7,191,440 B2 | 3/2007 | Cota-Robles et al. |
| 2002/0138711 A1 | 9/2002 | Bink et al. ...................... 712/34 |
| 2002/0165848 A1 | 11/2002 | Rautenbach et al. |
| 2003/0079202 A1 | 4/2003 | Sokolov ........................ 717/118 |
| 2003/0217250 A1 | 11/2003 | Bennett et al. |
| 2004/0025158 A1 | 2/2004 | Traut ................................ 718/1 |
| 2005/0076186 A1 | 4/2005 | Traut |

FOREIGN PATENT DOCUMENTS

EP            1524596          4/2005

OTHER PUBLICATIONS

Elliot et al., "Virtual Machine Simulation on Non-Virtualizable Computing Machines," *IBM Technical Disclosure Bulletin*, 1977, 19(8), 3144-3146.
"Internet Archive Wayback Machine," *Internet Article*, http://www.web.archive.org/web/*/http://www.plex86.org/research/paper.txt>, 2007, 1 page.

(Continued)

*Primary Examiner* — Afshawn Towfighi
(74) *Attorney, Agent, or Firm* — Woodcock Washburn LLP (57) ABSTRACT

The present invention is a system for and method of providing instruction sequence compounding by (1) the virtual machine monitor's (VMM) looking ahead when an initial trap (exception) event occurs and recognizing traps within successive nearby instructions, combining and virtually executing the effects of multiple instructions while remaining inside the VMM's trap handler, and thereby minimizing the number of individual traps that would otherwise occur at each instruction and/or (2) the VMM's looking ahead when an initial context switch event occurs and recognizing context switches within successive nearby instructions, virtually combining the effects of multiple instructions and handing off this combined instruction to the host operating system, and thereby minimizing the number of individual context switches that would otherwise occur at each instruction. As a result, the number of processor cycles is reduced for exception handling and context switching in a virtual machine environment.

23 Claims, 8 Drawing Sheets

(56) References Cited

OTHER PUBLICATIONS

Lawton, K., "Running multiple operating systems currently on an IA32 PC using virtualization techniques," *Internet Article*, http://www.web.archive.org/web/20000903023538/http://www.plex86.org/research/paper.txt>, 2000, 1-23.

Popek, G. J., "Formal Requirements for Virtualizable Third Generation Architectures," *Communications of the Association for Computing Machinery*, 1974, 17(7), 412-421.

Whitaker et al., "Denali: Lightweight Virtual Machines for Distributed and Networked Applications," *Proceedings of the Usenix Annual Technical Conference*, 2002, 1-14.

Robin et al., "Analysis of the Intel Pentium's Ability to Support a Secure Virtual Machine Monitor", Aug. 14, 2000, USENIX, pp. 1-17.

A. Tamches, "Fine-Grained Dynamic Instrumentation of Commodity Operating System", May 2001, University of Wisconsin—Madison, pp. 1-213.

J. S. Robin, "Analyzing the Intel Pentium's Capability to Support a Secure Virtual Machine Monitor", Sep. 1999, Naval Postgraduate School, pp. 1-98.

K. P. Lawton, "Bochs x86 Emulator—monitor-host.c", Mar. 25, 2000, bochs.sourceforge.net, pp. 1-42.

Carlos et al., "User-Kernel Reactive Threads for Linux", Jan. 2003, SCI 2003, pp. 1-6.

V86, "Virtual 8088 Mode", 1986, Intel 80386 Programmer's Reference, pp. 1-18.

K. Lawton, "Running Multiple Operating Systems Concurrently on an IA32 PC Using Virtualization Techniques", Nov. 1999, pp. 1-44K.

Lawton, "Running Multiple Operating Systems Concurrently on an IA32 PC Using Virtualization Techniques", Nov. 1999, pp. 1-44.

\* cited by examiner

SYSTEMS AND METHODS FOR INSTRUCTION SEQUENCE COMPOUNDING IN A VIRTUAL MACHINE ENVIRONMENT

CROSS-REFERENCE

The present invention is a continuation-in-part of related U.S. patent application Ser. No. 10/685,051, filed on Oct. 14, 2003 now U.S. Pat. No. 7,552,426 and entitled, "SYSTEMS AND METHODS FOR USING SYNTHETIC INSTRUCTIONS IN A VIRTUAL MACHINE," the entirety of which is hereby incorporated by reference herein this application.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. As an example, the Virtual PC software created by Connectix Corporation of San Mateo, California emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment might also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

Processors typically offer at least two instruction privilege levels, for example, a privileged mode and a user mode. Software running in privileged mode (that is, trusted software) is able to access privileged processor resources, including registers, modes, settings, in-memory data structures, and so forth. In contrast, user mode is intended for untrusted software that performs the majority of the computational work in a modern system. Many processors (but not all) make a strict distinction between user-level state and privileged-level state (corresponding to each mode), and access to privileged-level state is not allowed when the processor is operating in user mode. This distinction allows the host operating system (or its equivalent) to protect key resources and prevent a buggy or malicious piece of user-level software from crashing the entire system.

In a virtual machine environment, the VMM prevents the virtualized code from "taking over" the system by differentiating between privileged-level and user-level operations (i.e., software that accesses privileged-level processor resources versus user-level resources). For the most part, the VMM is able to hide the fact that code intended to be run at privileged-level is actually executing at user-level. More specifically, this illusion that allows privileged-level code to run at user-level is maintained by privileged operations, which are generated by the guest OS, being caught by the VMM and passed on to the guest's trap handlers, i.e., exception handlers (the terms trap handler or exception handler are used interchangeably). As known by one skilled in the art, a trap handler (or exception handler) executes a set of routines that are used to detect deadlock conditions or to process abnormal conditions. A trap handler allows the normal running of processes to be interrupted and resumed.

The execution of privileged-level code in a virtual machine environment, however, involves running privileged-level code of the guest OS at user-level, despite the fact that privileged-level code is written with the assumption that it will have full access to all privileged state elements of the processor. To reconcile this, the virtual machine relies on the processor to generate a trap for all privileged instructions (i.e., instructions that directly or indirectly access the privileged state). The privilege violation trap invokes a trap handler within the VMM. The VMM's trap handler then emulates the implied state changes of the privileged instruction and returns control back to the subsequent instruction. This emulation of a privileged instruction often involves the use of a shadow state that is private to a particular VM instance. For example, if a processor architecture includes a privileged mode register (PMR), which can only be accessed in privileged mode, any attempt to read from or write to the PMR from user-level code would cause a trap. The VMM's trap handler determines the cause of the trap and refers to a PMR shadow value that is private to the instance of the associated VM.

There is significant overhead associated with the VMM's handling each exception event. Therefore, the overall overhead of the VM is determined by how often these privileged-level instructions are executed by the guest OS, each of which causes a trap for which the VMM emulates that instruction, all of which takes time. It also takes time for the physical hardware to generate the trap in the first place. As a result, a privileged-level instruction that normally may have used only one processor cycle now may use thousands of processor cycles. What is needed is a way to reduce the overhead caused by exception handling in a virtual machine and thereby provide improved performance in the virtual machine environment.

Another scenario that adversely affects VM performance is the case in which an exception cannot be handled entirely in the context of the VM environment. More specifically, some of the operations in the VM invoke services on the host OS, for example, a request to read from a disk. In order to execute this request, a "context switch" must occur from the VM context to the host context. Like trap handling, performing the "context switch" is very expensive, i.e., requires thousands of additional processor cycles. What is needed is a way to reduce the overhead caused by a "context switch" in a virtual machine and thereby provide improved performance in the virtual machine environment.

SUMMARY OF THE INVENTION

Several embodiments of the present invention provide a means for improving performance and efficiency in a virtual machine environment, and certain of these embodiments are specifically directed to reducing processor cycles for exception handling and context switching in a virtual machine environment.

Certain embodiments of the present invention are directed to a system for and method of providing instruction sequence compounding by the VMM's looking ahead when an initial trap (exception) event occurs and recognizing traps within successive nearby instructions, combining and virtually executing the effects of multiple instructions while remaining inside the VMM's trap handler, and thereby minimizing the number of individual traps that would otherwise occur at each instruction.

Certain embodiments also provide instruction sequence compounding by the VMM's looking ahead when an initial context switch event occurs and recognizing context switches within successive nearby instructions, virtually combining the effects of multiple instructions and handing off this combined instruction to the host OS, and thereby minimizing the number of individual context switches that would otherwise occur at each individual instruction.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Microprocessors

Figure 1A:
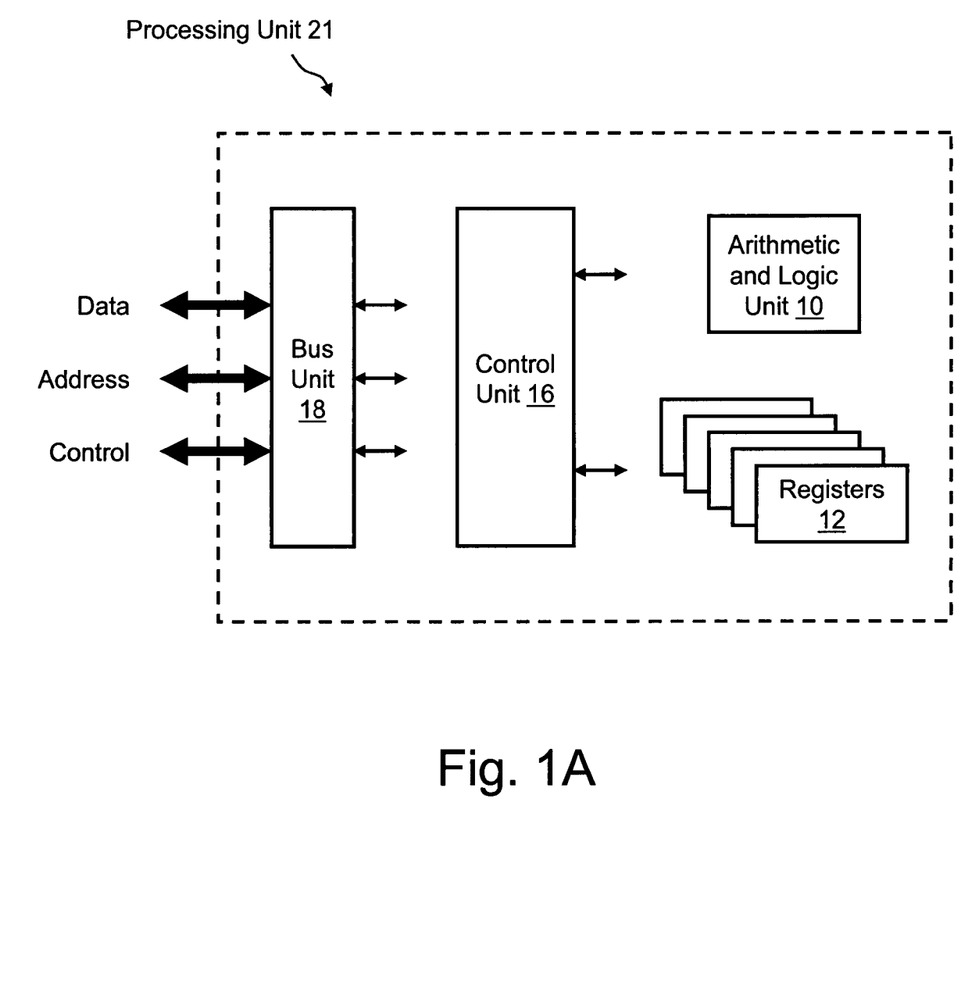
FIG. 1A is a block diagram representing portions of a typical x86 architecture microprocessor.

FIG. 1A is a block diagram of a processing unit 21 representing portions of a typical x86 architecture microprocessor, which is a computer processor on a microchip. Processing unit 21 is designed to include, for example, an arithmetic and logic unit 10 which performs arithmetic and logic operations that make use of multiple registers 12. Additional portions of processing unit 21 are described in reference to FIG. 1B.

The purpose of a register, such as one of registers 12, is to hold temporary results, and control the execution of the program. Typical microprocessor operations performed by arithmetic and logic unit 10 include adding, subtracting, comparing two numbers, and fetching numbers from one area to another. These operations are the result of a set of instructions that are part of the microprocessor design. These instructions are the result of a control unit 16 interpreting data, address, and control inputs as received via a bus unit 18.

An instruction is an order given to a computer processor by a computer program. At the lowest level, each instruction is a sequence of 0s and 1s that describes a physical operation the computer is to perform (such as "Add") and, depending on the particular instruction type, the specification of special storage areas (i.e., registers 12) that may contain data to be used in carrying out the instruction, or the location in computer memory of data.

Each register 12 is one of a small set of data holding places that are part of a computer processor. A register may hold a computer instruction, a storage address, or any kind of data (such as a bit sequence or individual characters). Some instructions specify registers as part of the instruction. For example, an instruction may specify that the contents of two defined registers be added together and then placed in a specified register. A register must be large enough to hold an instruction—for example, in a 32-bit instruction computer, a register must be 32 bits in length. In some computer designs, there are smaller registers—for example, half-registers—for shorter instructions. Depending on the processor design and language rules, each register 12 may be numbered or have arbitrary names. As used herein, however, the specific registers, specific instructions, and other technical elements described with specificity herein are based on the x86-architecture and, as such, are widely known and well-understood by those of skill in the art.

Computer Environment

Figure 1B:
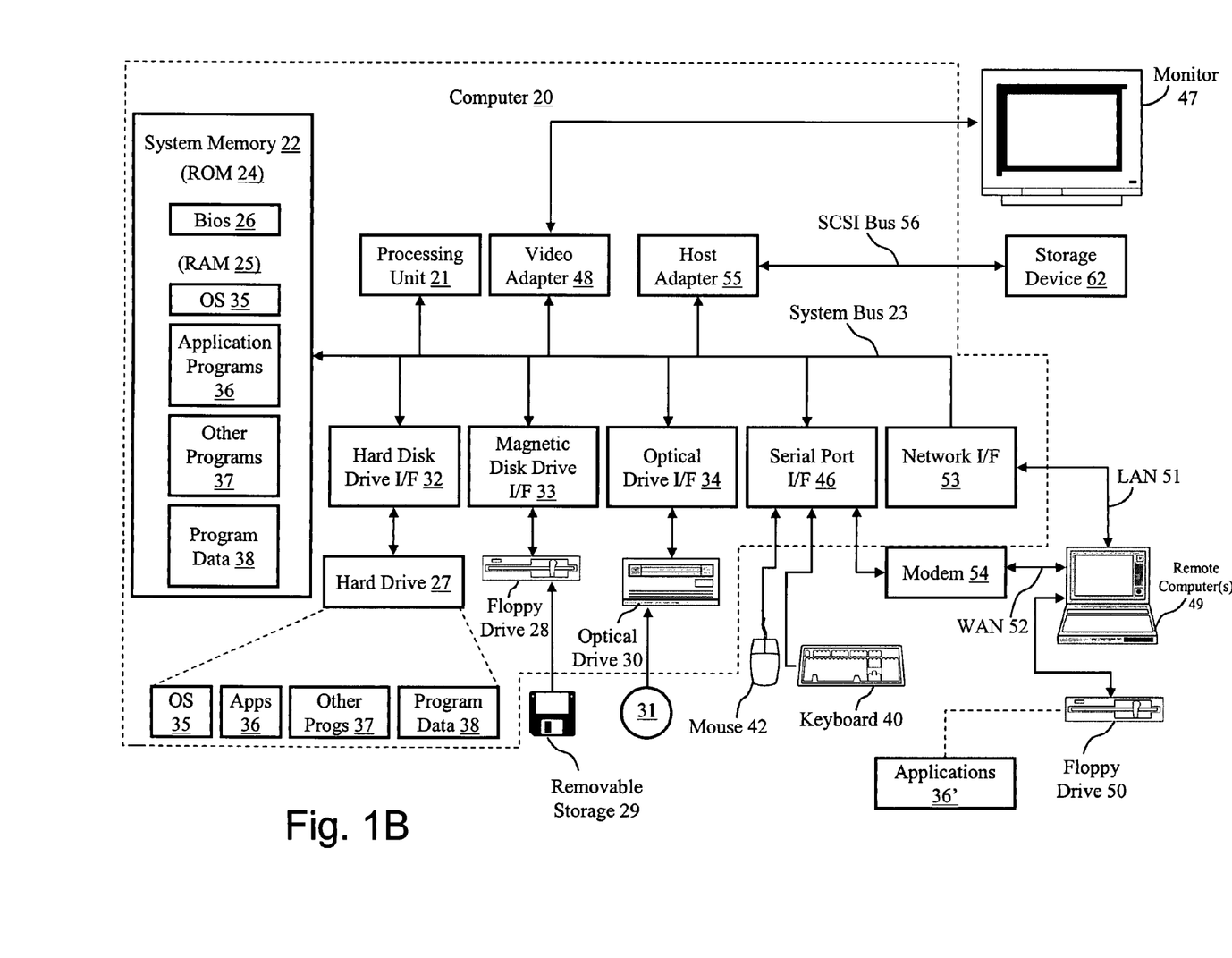
FIG. 1B is a block diagram representing a computer system in which aspects of the present invention may be incorporated.

Numerous embodiments of the present invention may execute on a computer. FIG. 1B and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1B, an exemplary general purpose computing system includes a conventional personal computer 20 or the like, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1B also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1B. The logical connections depicted in FIG. 1B include a local area network (LAN) 51 and a wide area network (WAN) 52.

Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
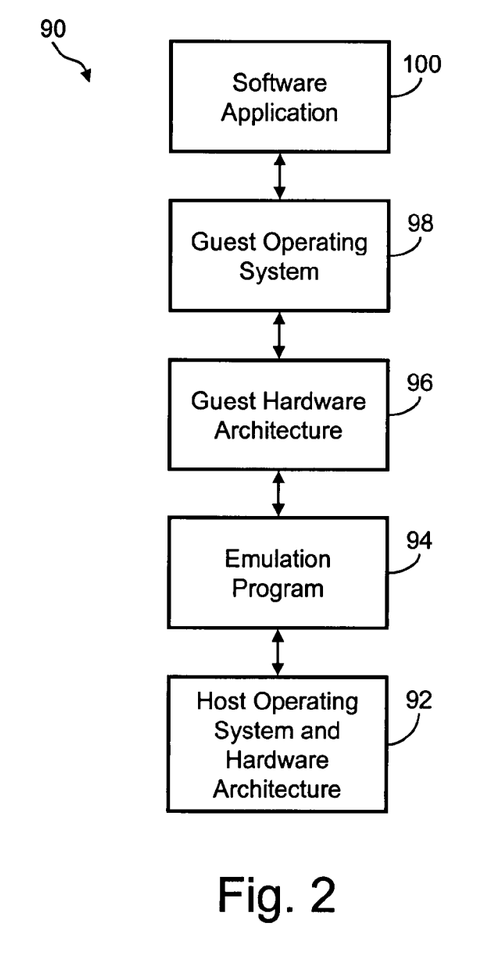
FIG. 2 illustrates the logical layering of the hardware and software architecture for an emulated operating environment in a computer system.

FIG. 2 is a diagram representing the logical layering of the hardware and software architecture for an emulated operating environment in a computer system. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

Figure 3A:
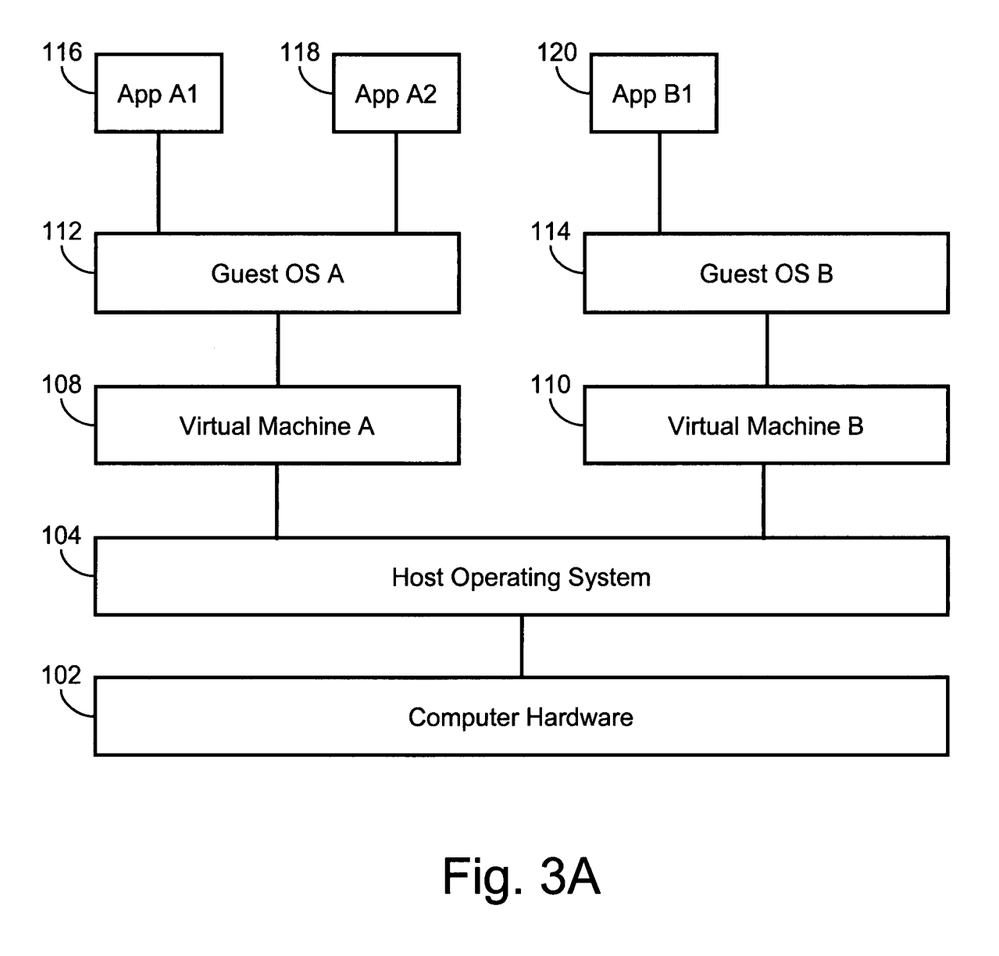
FIG. 3A illustrates a virtualized computing system.

FIG. 3A illustrates a virtualized computing system comprising a host operating system software layer 104 running directly above physical computer hardware 102, and the host operating system (host OS) 104 virtualizes all the resources of the machine by exposing interfaces that are the same as the hardware the host OS is virtualizing (which enables the host OS to go unnoticed by operating system layers running above it).

Figure 3B:
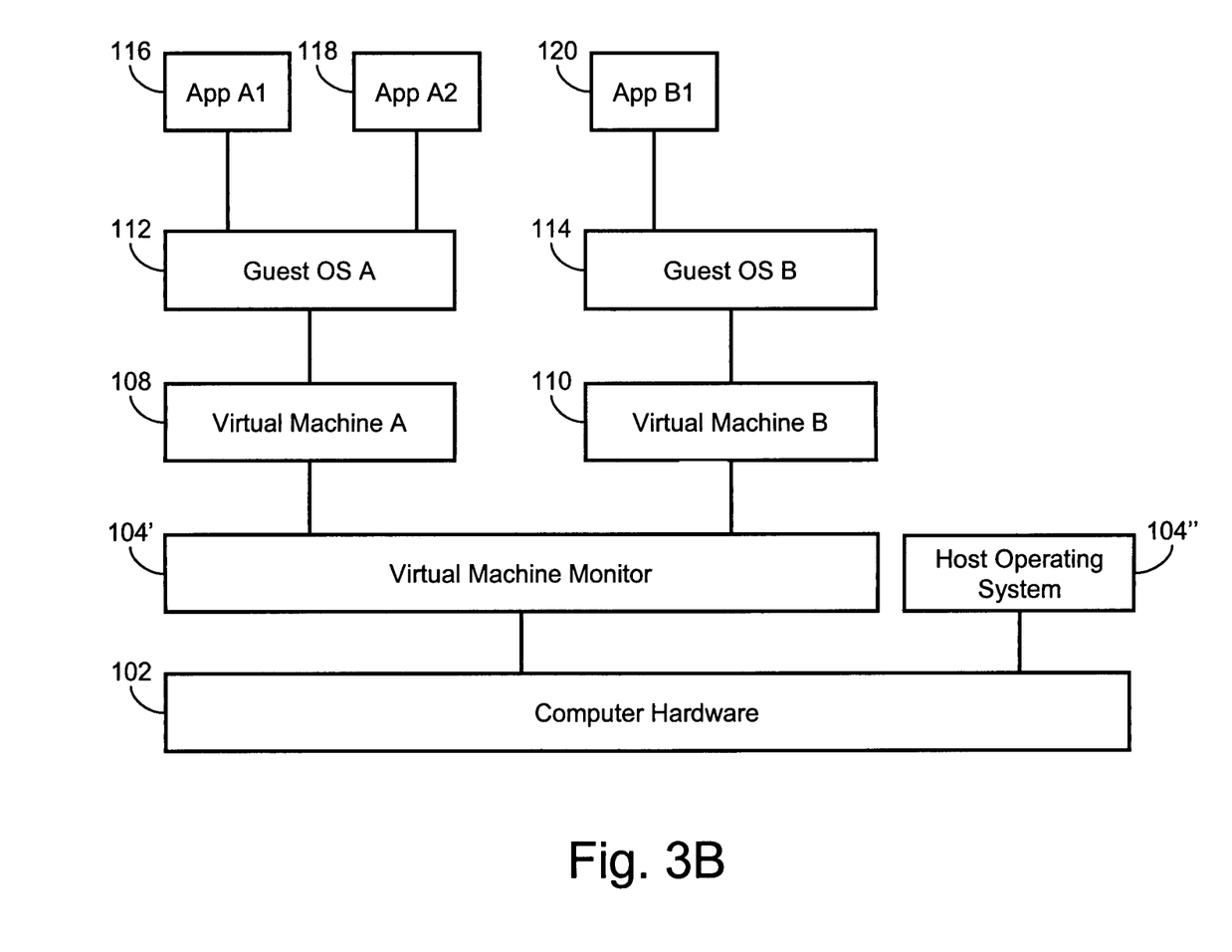
FIG. 3B illustrates an alternative embodiment of a virtualized computing system comprising a virtual machine monitor running alongside a host operating system.

Alternately, a virtual machine monitor, or VMM, software layer 104' may be running in place of or alongside a host operating system 104'', the latter option being illustrated in FIG. 3B. For simplicity, all discussion hereinafter (specifically regarding the host operating system 104) shall be directed to the embodiment illustrated in FIG. 3A; however, every aspect of such discussion shall equally apply to the embodiment of FIG. 3B wherein the VMM 104' of FIG. 3B essentially replaces, on a functional level, the role of the host operating system 104 of FIG. 3A described herein below.

Referring again to FIG. 3A, above the host OS 104 (or VMM 104') are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSes) A 112 and B 114 respectively. Above guest OS A 112 are running two applications, application A1 116 and application A2 118, and above guest OS B 114 is application B1 120.

Instruction Compounding for VM Exception Handling

Figure 4:
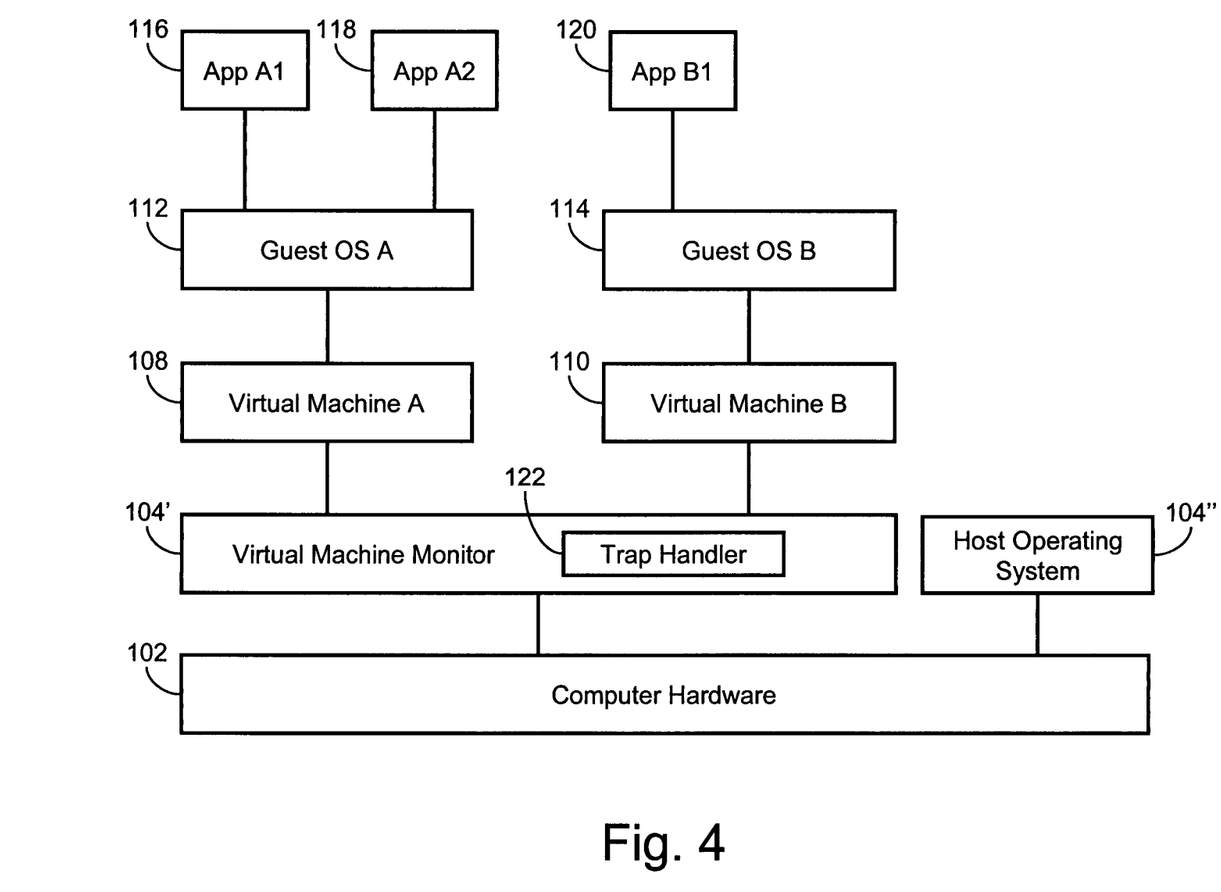
FIG. 4 illustrates portions of the system of FIG. 3B and further includes a trap handler within the virtual machine monitor.

FIG. 4 illustrates portions of the system of FIG. 3B and further includes a trap handler 122 within VMM 104'. Trap handler 122 performs the well-known task of executing a set of routines that are used to detect deadlock conditions or to process abnormal conditions. Trap handler 122 allows the normal running of processes to be interrupted and then resumed.

The use of VMM 104' and trap handler 122 of the virtualized computing system of FIG. 4 provides a method of reducing the overhead associated with exception handling. This is accomplished by the user's programming VMM 104' to detect sequences of code in which the guest OS, such as guest OS A 112, may have executed a number of privileged-level instructions near each other. These sequences are analyzed to determine whether a certain series of instructions can be handled as a whole by VMM 104', for example, by replacing multiple privileged-level instructions, which cause traps, with other code that handles the series of instructions as a group, i.e., instruction compounding. In this way, the performance of the virtualized computing system of FIG. 4 is optimized according to a first embodiment of the invention.

As an example, a sequence of instructions that uses one or more CLI, OUT, MOV or STI instructions based on the x86-architecture is provided, i.e., CLI=clear interrupt flag (disable interrupts), OUT=output (write) to port, MOV=move data, STI=set interrupt flag (enable interrupts).

Example Instruction Sequence #1 Running in Guest OS A 112

CLI—clear interrupt flag (disable interrupts);
OUT 21,AL—output the data contained in register AL to port 21;
MOV AL,AH—move the value in register AH into register AL;
OUT A1,AL—output the data contained in register AL to port A1; and
STI—set interrupt flag (enable interrupts).

In this example instruction sequence running in a VM environment, four of the five instructions cause an exception to occur. More specifically, the CLI instruction, the two OUT instructions, and the STI instruction cause a trap that is handled by trap handler 122 of VMM 104'. Table 1 illustrates a comparison of estimated total processor cycles that are used when instruction sequence #1 is run 1) on physical hardware, 2) in a non-optimized VM environment, and 3) in the optimized VM environment of the present invention.

TABLE 1

Comparison of estimated total processor cycles

| | Processor cycle count | | |
|---|---|---|---|
| | Physical Hardware environment | VM environment (non-optimized) | VM environment (optimized) |
| CLI* | 1 | ≈3,000 | ≈3,000 |
| OUT* 21, AL | ≈20 | ≈3,000 | ≈100 |
| MOV AL, AH | 1 | 1 | ≈100 |
| OUT* A1, AL | ≈20 | ≈3,000 | ≈100 |
| STI* | 1 | ≈3,000 | ≈100 |
| Total cycles= | ≈43 | ≈12,001 | ≈3,400 |

*instructions that cause a trap (an exception)

Table 1 illustrates that, compared with the processor cycles of the physical hardware environment, there is approximately a 3,000 to 1 increase in processor cycles in the non-optimized VM environment whenever in instruction is executed that causes a trap, i.e., each time the instruction sequence enters and exits the trap handler in the non-optimized VM environment. Consequently, in this example instruction, sequence significant overhead is expended, i.e., 12,001 vs. 43 processor cycles, in the non-optimized VM environment, compared with that of the physical hardware environment. However, the optimization method of the present invention provides approximately a 3.5x improvement over the non-optimized VM environment, i.e., 12,001 processor cycles reduced to 3,000 cycles. The optimization provided by VMM 104' and trap handler 122 is achieved by the user's entering trap handler 122 on the CLI instruction, which expends approximately 3,000 cycles; but, instead of then exiting trap handler 122, as is normal, VMM 104' looks ahead and analyzes a determinable number of instructions near the CLI instruction to determine whether these "nearby" instructions will also cause a trap. In one set of embodiments, "nearby" instructions are those instructions that will cause a trap that are within a predetermined number of instructions from the last instruction identified that will cause a trap; other embodiments may use a different algorithm for ascertain what and how many "nearby" instructions to examine.

Without exiting trap handler 122, VMM 104' then executes virtually (that is, within the virtual machine) the implied effects of the OUT, then the MOV, then the OUT, and then the STI instructions before exiting trap handler 122, and these instructions are never sent to the physical hardware (thereby avoiding the exception that leads to the trap handling routine). In this way, the 3,000 processor cycles are not expended by entering and exiting trap handler 122 at each of the first OUT, second OUT, and STI instructions; instead, only approximately 100 processor cycles are expended for performing the analysis of each instruction, including the MOV instruction. In summary, the optimization is achieved by VMM 104' looking ahead when an initial trap event occurs and recognizing traps within successive nearby instructions, combining and virtually executing the effects of multiple instructions while remaining inside trap handler 122, and thereby minimizing the number of individual traps that would otherwise occur at each instruction by essentially preventing these instructions from proceeding to the physical hardware at all.

Figure 5:
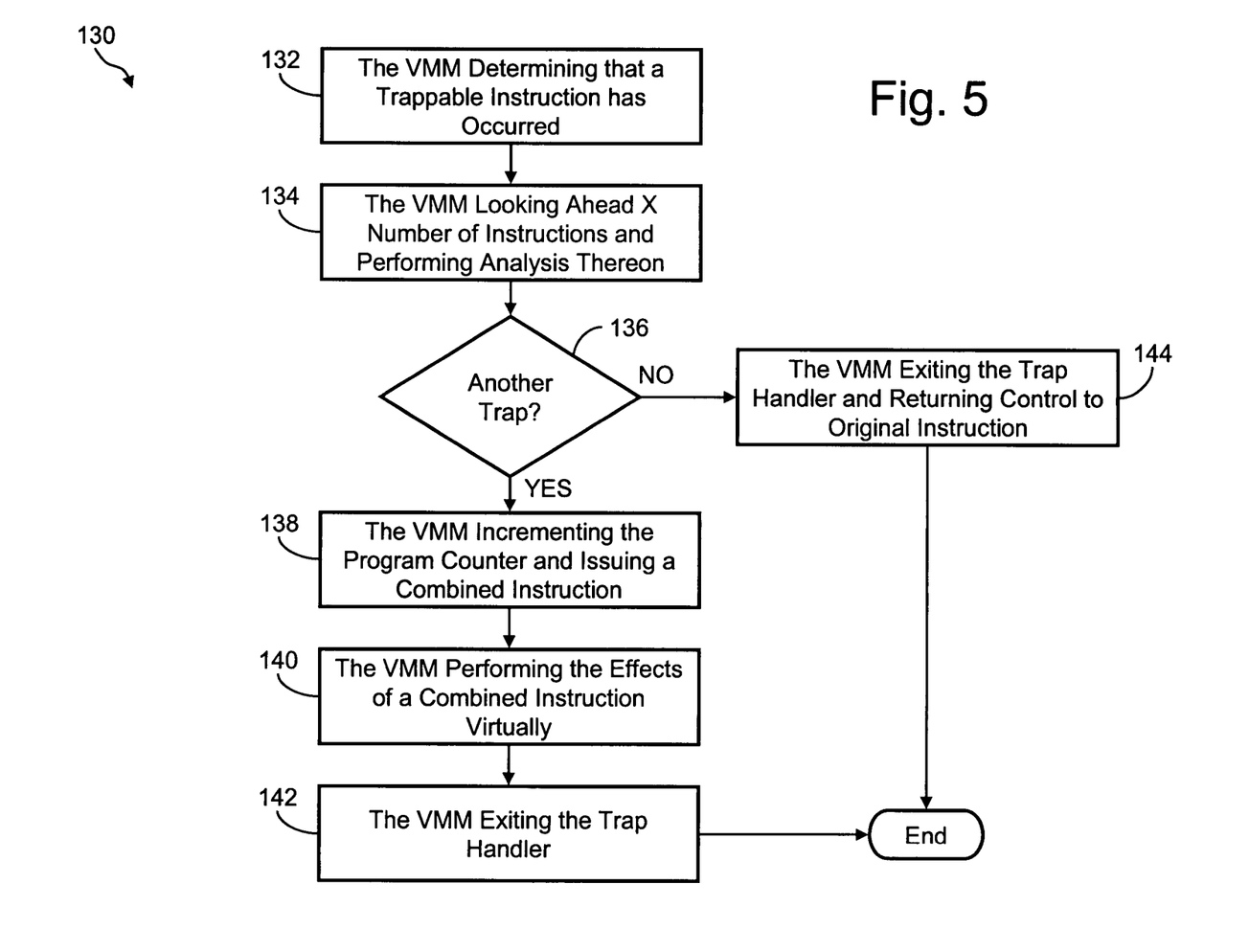
FIG. 5 illustrates a flow diagram of a method of instruction compounding by the VMM's looking ahead one instruction and minimizing trap events according to a first embodiment of the invention.

FIG. 5 illustrates a flow diagram of a method 130 of instruction compounding by the VMM's looking ahead one instruction and minimizing trap events by using the virtualized computing system of FIG. 4 in accordance with the first embodiment of the invention. The method first includes, at step 132, VMM 104' performing a determination that a trappable instruction has occurred and, thus, the instruction enters trap handler 122. At step 134, VMM 104' looks ahead one instruction and performs analysis thereon. At step 136, based upon the analysis of step 134, VMM 104' determines whether the instruction is a trappable instruction. If it is determined that the instruction is a trappable instruction, at step 138, VMM 104' increments the program counter and issues a virtualized instruction that performs the combined effects of the instructions of steps 132 and 134. At step 140, while remaining inside trap handler 122, VMM 104' performs the virtualized instruction issued at 138. At step 142, VMM 104' exits trap handler 122 and the method ends. If it at step 136 it is determined that the instruction is not a trappable instruction, at step 144, VMM 104' exits trap handler 122, returns control back to the original instruction of step 132, and the method ends.

In alternative embodiments, method 130 is expanded to look ahead a set number of instructions or to look ahead some number of instructions based upon a predetermined algorithm for this purpose. More specifically, it is understood by those skilled in the art that step 134 is easily modified to look ahead any number of instructions. An example of such a modification is shown in Table 1 above, in which VMM 104' looks ahead 4 instructions from CLI to STI.

In yet another alternative embodiment, the improved optimization of the virtualized computing system of FIG. 4 that uses VMM 104' and trap handler 122 is OS-based. Meaning, VMM 104' and trap handler 122 are programmed, based upon a known operating system type and one or more known instruction sets that the user wishes to optimize. For example, it may be known that when a CLI occurs for a given operating system, it is always followed by the same sequence of instructions, thus trap handler 122 of VMM 104' is programmed specifically for that instruction sequence for that operating system.

Instruction Compounding for VM Context Switching

Referring again to the virtualized computing system of FIG. 4, a method of reducing the overhead associated with context switching is provided according to a second set of embodiments of the present invention. This is accomplished by programming VMM 104' to detect operations in which the guest OS, such as guest OS A 112, invokes services in host OS 104" and, thus, requires a context switch between VMM 104' and host OS 104". These operations are analyzed to determine whether a certain series of instructions that cause a context switch can be handled as a whole by VMM 104', for example, combining two instructions that require a context switch into a single transition context switch, i.e., instruction compounding. In this way, the performance of the virtualized computing system of FIG. 4 is optimized.

As an example, a sequence of instructions that uses one or more OUT or MOV instructions based on the x86-architecture is provided, i.e., OUT=output (write) to port, MOV=move data.

Example Instruction Sequence #2 Running in Guest OS A 112

OUT 21,AL—output the data contained in register AL to port 21;
MOV AL,AH—move the value in register AH into register AL; and
OUT A1,AL—output the data contained in register AL to port A1.

In this example instruction sequence running in a VM environment, two of the three instructions cause a context switch to occur. More specifically, the two OUT instructions cause a context switch that is handled by VMM 104'. Table 2 illustrates a comparison of estimated total processor cycles that are used when instruction sequence #2 is run 1) on physical hardware, 2) in a non-optimized VM environment, and 3) in the optimized VM environment of the present invention.

TABLE 2

Comparison of estimated total processor cycles

| | Processor cycle count | | |
|---|---|---|---|
| | Physical Hardware environment | VM environment (non-optimized) | VM environment (optimized) |
| OUT* 21, AL | ≈20 | ≈15,000 | ≈15,000 |
| MOV AL, AH | 1 | 1 | 1 |
| OUT* A1, AL | ≈20 | ≈15,000 | ≈20 |
| Total cycles= | ≈41 | ≈30,001 | ≈15,021 |

*instructions that cause a context switch

Table 2 illustrates that, compared with the processor cycles of the physical hardware environment, there is approximately a 15,000 to 20 increase in processor cycles in the non-optimized VM environment whenever in instruction is executed that causes a context switch. Consequently, in this example, instruction sequence significant overhead is expended, i.e., 30,001 vs. 41 processor cycles, in the non-optimized VM environment compared with that of the physical hardware environment.

However, the optimization method of the present invention provides approximately a 2x improvement over the non-optimized VM environment, i.e., 30,001 processor cycles reduced to 15,021 cycles. A specific example of instruction compounding to optimize context switching by combining two OUT instructions is provided as follows. The instruction sequence of OUT 21,AL/MOV AL,AH/OUT A1,AL, as described above, is replaced with OUT 21,AX. In summary, the x86 architecture has a register called EAX. One byte of the register is called AL and another byte is called AH. AL and AH, combined, are called AX. Whereas the original code outputs the data contained in register AL to port 21, then moves the value in register AH into register AL, then outputs the data contained in register AL to port A1, this embodiment of the invention, OUT 21,AX, moves both values, AL and AH, to AX and thereby combines the two bytes into one port access and sends them to port 21. Of course, real hardware would not allow this but, because the VM environment uses a software version of the hardware, the VM environment can modify the port 21 handler, such that if two bytes are sent to port 21, the VM environment makes it look as though the first byte is sent to port 21 and the second byte is sent to A1, while the VM environment performs only a single context switch operation. The embodiment is knowledge based, in that VMM 104' and host OS 104" are aware that this sequence always uses port 21 and A1 and, thus, AX will be deconstructed accordingly.

Figure 6:
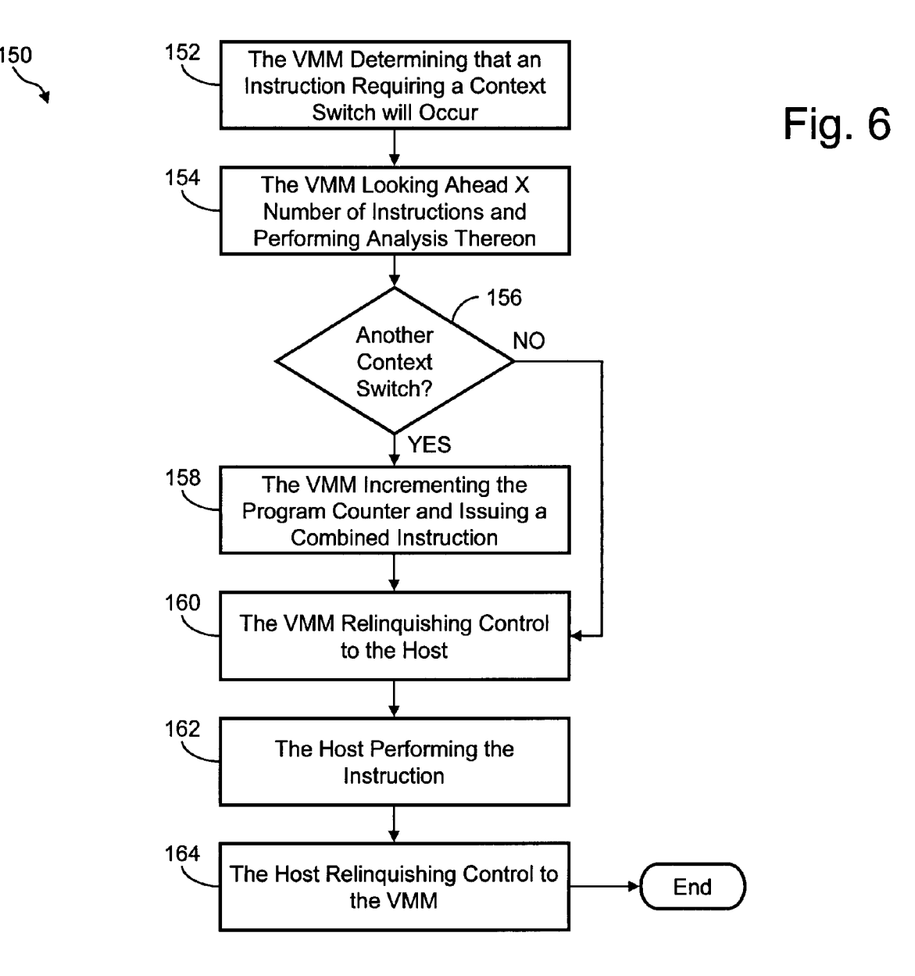
FIG. 6 illustrates a flow diagram of a method of instruction compounding by the VMM's looking ahead one instruction and minimizing context switch events according to a second embodiment of the invention.

FIG. 6 illustrates a flow diagram of a method 150 of instruction compounding by looking ahead "X" number of instructions (where X is a predetermined or algorithmically determinable number) and minimizing context switch events using the virtualized computing system of FIG. 4 in accordance with the second set of embodiments of the present invention. The method first includes, at step 152, VMM 104' performing a determination that a context switch instruction is about to occur and the instruction, which requires a context switch, enters the context switch handler 122. At step 154, VMM 104' looks ahead X number of instructions and performs analysis thereon. At step 156, based upon the analysis of step 154, VMM 104' determines whether any of the subsequent X instructions requires a context switch. If it is determined that, for example, the second instruction requires a context switch, at step 158, VMM 104' increments the program counter and issues a virtualized instruction, such as OUT 21,AX, as described above, that performs the combined effects of the instructions of steps 152 and 154. At step 160, VMM 104' relinquishes control to host OS 104". At step 162, host OS 104" performs the combined instruction issued by VMM 104' at 158. At step 164, host OS 104" relinquishes control to VMM 104' and the method ends. If it at step 156 it is determined that the second instruction does not require a context switch, VMM 104' passes the instruction of step 152 to host OS 104" at step 160.

In summary, the optimization is achieved by VMM 104''s looking ahead when an initial context switch is determined to be necessary and recognizing context switches within successive nearby instructions, virtually combining the effects of multiple instructions and handing off this combined instruction to host OS 104", and thereby minimizing the number of individual context switches that would otherwise occur at each instruction.

In alternative embodiments, method 150 is expanded to look ahead a set number of instructions or to look ahead some number of instructions based upon an algorithm employed for this purpose. More specifically, it is understood by those skilled in the art that step 154 is easily modified to look ahead any number of instructions. An example of such a modification is shown in Table 2 above, in which VMM 104' looks ahead two instructions.

Instruction Compounding Combined with "Synthetic Instructions"

In yet another embodiment, the VM optimization methods that use instruction compounding as disclosed herein are used in combination with "synthetic instructions," as described in reference to U.S. patent application Ser. No. 10/685051 filed on Oct. 14, 2003 and entitled "SYSTEMS AND METHODS FOR USING SYNTHETIC INSTRUCTIONS IN A VIRTUAL MACHINE" which describes an invention that compensates for the shortcomings in x86 processor architectures by providing a set of "synthetic instructions" that cause a trap and thereby provide an opportunity for the virtual machine to process the instructions safely. By using instructions that are "illegal" to the x86 architecture, but which are nonetheless understandable by a virtual machine, the method of using these synthetic instructions to perform well-defined actions in the virtual machine that are otherwise problematic when performed by traditional instructions to an x86 processor provide much-improved processor virtualization for x86 processor systems.

Example "synthetic instructions" according to Microsoft invention disclosure MSFT-2570/305147.01 include:

VMCLI—Clear Interrupt Flag

VMCLI is similar to the normal CLI instruction, except that it is five bytes long and can be patched to avoid trapping into the VMM. This instruction can only be used within privileged-level code.

VMSTI—Set Interrupt Flag

VMSTI is similar to the normal STI instruction, except that it is five bytes long and can be patched to avoid trapping into the VMM. It also differs from the normal STI, in that it does not prevent an interrupt from occurring before the next instruction is complete. The only exception to this rule is if the VMSTI is followed by a SYSEXIT instruction, which is executed atomically, along with the VMSTI. This instruction can only be used within privileged-level code.

For example, in the example instruction sequence of CLI, OUT, MOV, OUT, STI the CLI and STI instructions are replaced with VMCLI and VMSTI synthetic instructions, respectively, and, thus, eliminate the trap on the CLI and STI instructions. (The synthetic instructions allow a branch to other code that never causes a trap.) Then the two OUT instructions are replaced with one OUT instruction, as described in the first and second embodiment of this invention.

Conclusion

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for decreasing the number of trap-handling exceptions in a computer system executing computer code instructions, the method comprising:

executing an application that invokes a first privileged instruction on a virtual machine executing on a physical computing device in a non-privileged mode;

when a first trap-handling exception occurs in response to execution of the first privilege-level instruction executing in a non-privileged mode on the physical computing device, analyzing each nearby instruction of a determinable number of nearby instructions after the first privileged instruction to determine that a second instruction of the determinable number of nearby instructions would cause a trap-handling exception if executed on the physical computing device, the trap-handling exception being processed by a trap handler to emulate an implied state change of a corresponding privilege-level instruction before allowing the corresponding privilege-level instruction to be executed, execution of the application being held at the first privilege-level instruction while analyzing each nearby instruction of a determinable number of nearby instructions; and executing on the virtual machine at least one additional instruction that will cause an exception in conjunction with handling the first instruction that caused the first trap-handling exception to occur and the second instruction and preventing the at least one additional instruction from being directly executed on the physical computing device and causing its own trap-handling exception.

2. The method of claim 1, further comprising:

using a synthetic instruction that does not cause an exception.

3. The method of claim 2, wherein the method is employed to exceptions for a virtual machine.

4. A system for decreasing the number of exceptions in a computer system executing computer code instructions, the system comprising:
- a computing unit comprising a processor;
- a memory in communication with the processor when the system is in an on state, the memory containing computer executable instructions that when executed by the processor, cause the following to occur:
  - when a first exception occurs in response to a virtual machine causing the execution of a first privilege-level instruction on the processor while the processor is in a non-privilege mode, analyzing a next predetermined number of nearby instructions after the first privileged instruction to determine that a second instruction that is in the next predetermined number of instructions to be executed after the first privileged instruction will also cause an exception if executed on the processor, execution of the application being held at the first privilege-level instruction while analyzing the next predetermined number of nearby instructions; and
  - executing on the virtual machine at least one additional instruction that will cause an exception in conjunction with handling the first instruction that caused the first exception to occur to prevent the at least one additional instruction from being directly executed on the processor and causing another exception.

5. The system as recited in claim 4, the memory further comprising:
- computer readable instructions for inserting a synthetic instruction that does not cause an exception in lieu of an instruction that would cause an exception.

6. The system of claim 5, further comprising:
- a subsystem whereby the method is employed to exceptions for a virtual machine.

7. A system for decreasing the number of context switches in a computer system executing computer code instructions, the system comprising:
- a computing unit comprising a processor;
- a memory in communication with the processor when the system is in an on state, the memory containing computer executable instructions that when executed by the processor, cause the following to occur:
  - when a first instruction that requires a context switch on the processor is encountered, analyzing a next predetermined number of nearby instructions after the first privileged instruction to determine that a second instruction that is in the next predetermined number of instructions to be executed after the first privileged instruction will cause a context switch if executed on the processor, execution of the application being held at the first instruction while analyzing the next predetermined number of nearby instructions;
  - combining the second instruction that will cause a context switch with the first instruction that requires a context switch to produce a combined instruction and
  - executing the combined instruction in a virtual machine to produce an intended result logically equivalent to an anticipated result that would have been achieved had the first instruction and the at least one additional instruction been executed.

8. The system of claim 7, further comprising:
- a subsystem whereby the method is employed to context switches for a virtual machine.

9. The system of claim 7, the memory further comprising computer readable instructions for:
- inserting a synthetic instruction that does not cause a context switch in lieu of an instruction that would require a context switch.

10. The system of claim 9, further comprising:
- a subsystem whereby the method is employed to context switches for a virtual machine.

11. A non-volatile computer-readable storage medium comprising computer-readable instructions for decreasing the number of exceptions in a computer system executing computer code instructions, the computer-readable instructions comprising instructions for:
- when a first exception occurs in response to a virtual machine causing the execution of a privilege-level instruction on a physical processor of the computer system while the processor is in a non-privilege mode, analyzing a next predetermined number of nearby instructions after the first privileged instruction to determine that a second instruction that is in the next predetermined number of instructions to be executed after the first privileged instruction will also cause an exception if executed on the processor, execution of the virtual machine being held at the first privileged instruction while analyzing the next predetermined number of nearby instructions; and
- executing on the virtual machine at least one additional instruction that will cause an exception in conjunction with handling the first instruction that caused the first exception to occur and preventing the second instruction from being directly executed on the processor and causing its own exception.

12. The computer-readable medium of claim 11, further comprising:
- instructions for using a synthetic instruction that does not cause an exception in lieu of an instruction that would cause an exception.

13. The computer-readable instructions of claim 12, further comprising:
- instructions whereby the method is employed to exceptions for a virtual machine.

14. A non-volatile computer-readable storage medium comprising computer-readable instructions for decreasing the number of context switches in a computer system executing computer code instructions, the computer-readable instructions comprising instructions for:
- when a first privileged instruction of a set of instructions that requires a context switch on a physical processor of the computer system is encountered, analyzing a next predetermined number of nearby instructions after the first privileged instruction to determine that a second instruction that is in the next predetermined number of instructions to be executed after the first privileged instruction will cause a context switch if executed on the processor, execution of the set of instructions being held at the first privileged instruction while analyzing the next predetermined number of nearby instructions;
- combining at least one additional instruction that will cause a context switch with the first instruction that requires a context switch to produce a combined instruction; and
- executing the combined instruction in a virtual machine to produce an intended result logically equivalent to an anticipated result that would have been achieved had the first instruction and the second instruction been executed.

15. The computer-readable medium of claim 14, further comprising:

instructions whereby the method is employed to context switches for a virtual machine.

16. The computer-readable medium of claim 14, further comprising:
computer-readable instructions using a synthetic instruction that does not cause a context switch in lieu of an instruction that would require a context switch.

17. The computer-readable instructions of claim 16, further comprising:
instructions whereby the method is employed to context switches for a virtual machine.

18. A hardware control device for decreasing the number of exceptions in a computer system executing computer code instructions, the hardware control device comprising:
means for causing, when a first exception occurs in response to a virtual machine, the execution of a privilege-level instruction on a physical processor of the computer system while the processor is in a non-privilege mode, and analyzing a next predetermined number of nearby instructions after the first privileged instruction to determine that a second instruction that is in the next predetermined number of instructions to be executed after the first privileged instruction will also cause an exception if executed on the processor, execution of the virtual machine being held at the privilege-level instruction while analyzing the next predetermined number of nearby instructions; and
means for executing on the virtual machine at least one additional instruction that will cause an exception in conjunction with handling the first instruction that caused the first exception to occur and preventing the second from being directly executed on the processor and causing its own exception.

19. The hardware control device of claim 18, further comprising:
means whereby the method is employed to handle exceptions that occur when a virtual machine executes privilege-level instructions while in a non-privilege mode.

20. A hardware control device for decreasing the number of context switches in a computer system executing computer code instructions, the hardware control device comprising:
means for analyzing, when a first privileged instruction of a set of instructions that requires a context switch on a physical processor of the computer system is encountered, a next predetermined number of nearby instructions after the first privileged instruction to determine that a second instruction that is in the next predetermined number of instructions to be executed after the first privileged instruction will cause a context switch on the physical computing device, execution of the set of instructions being held at the first privileged instruction while analyzing the next predetermined number of nearby instructions;
means for combining the second instruction that will cause a context switch with the first instruction that requires a context switch to produce a combined instruction; and
means for executing the combined instruction in a virtual machine to produce an intended result logically equivalent to an anticipated result that would have been achieved had the first instruction and the at least one additional instruction been executed.

21. The hardware control device of claim 20, further comprising:
means whereby the method is employed to context switches for a virtual machine.

22. The hardware control device of claim 20, further comprising:
means for the utilization of a synthetic instruction that does not cause a context switch in lieu of an instruction that would require a context switch.

23. The hardware control device of claim 22, further comprising:
means whereby the method is employed to context switches for a virtual machine.

* * * * *